United States Patent
Stanco et al.

[11] Patent Number: 5,784,158
[45] Date of Patent: Jul. 21, 1998

[54] BROAD SPECTRUM SPECTROMETER APPARATUS

[75] Inventors: Alexei Stanco, Adelaide; Mark Aizfagendler, Grange, both of Australia

[73] Assignee: Lastek Laboratories Pty. Ltd., Australia

[21] Appl. No.: 755,486

[22] Filed: Nov. 22, 1996

[30] Foreign Application Priority Data

Nov. 22, 1995 [AU] Australia ............... PN6741
Dec. 14, 1995 [AU] Australia ............... PN7152

[51] Int. Cl.$^6$ ............... G01J 3/02; G01J 3/12
[52] U.S. Cl. ............... 356/326; 356/328
[58] Field of Search ............... 356/308, 305, 356/326, 328, 331, 332, 333, 334

[56] References Cited

U.S. PATENT DOCUMENTS

| | | | |
|---|---|---|---|
| 3,586,442 | 6/1971 | Tripp | 356/333 |
| 3,708,227 | 1/1973 | Krakow et al. | 356/308 |
| 3,973,849 | 8/1976 | Jackson et al. | 356/308 |
| 4,158,505 | 6/1979 | Mathisen et al. | 356/308 |

Primary Examiner—F. L. Evans
Attorney, Agent, or Firm—Renner, Kenner, Greive, Bobak, Taylor & Weber

[57] ABSTRACT

This invention is for a broad spectrum apparatus that provides a substantially uniform spectral response from a spectrometer by introducing one or more elements whose combined response or correction factor is the inverse of that produced by the rest of the apparatus. The response of the elements can be formed either pre or post dispersion. In the case of pre-dispersion the correcting components may be optical components chosen from a full combination of optical filters, either purely transmissive or a combination of transmissive and reflective as in the case of dichroic mirrors, optical lenses with chromatic aberration, integrating spheres or other diffusers coated with material whose response is wavelength dependant. The post-dispersive application may involve a spatial filter or shaped aperture to partially block the more intense wavelengths. A particular attractive application may be a mask that is directly etched onto the surface of a CCD array detector. Post-dispersive applications may also include custom neutral density filters or variable neutral density filters.

29 Claims, 10 Drawing Sheets

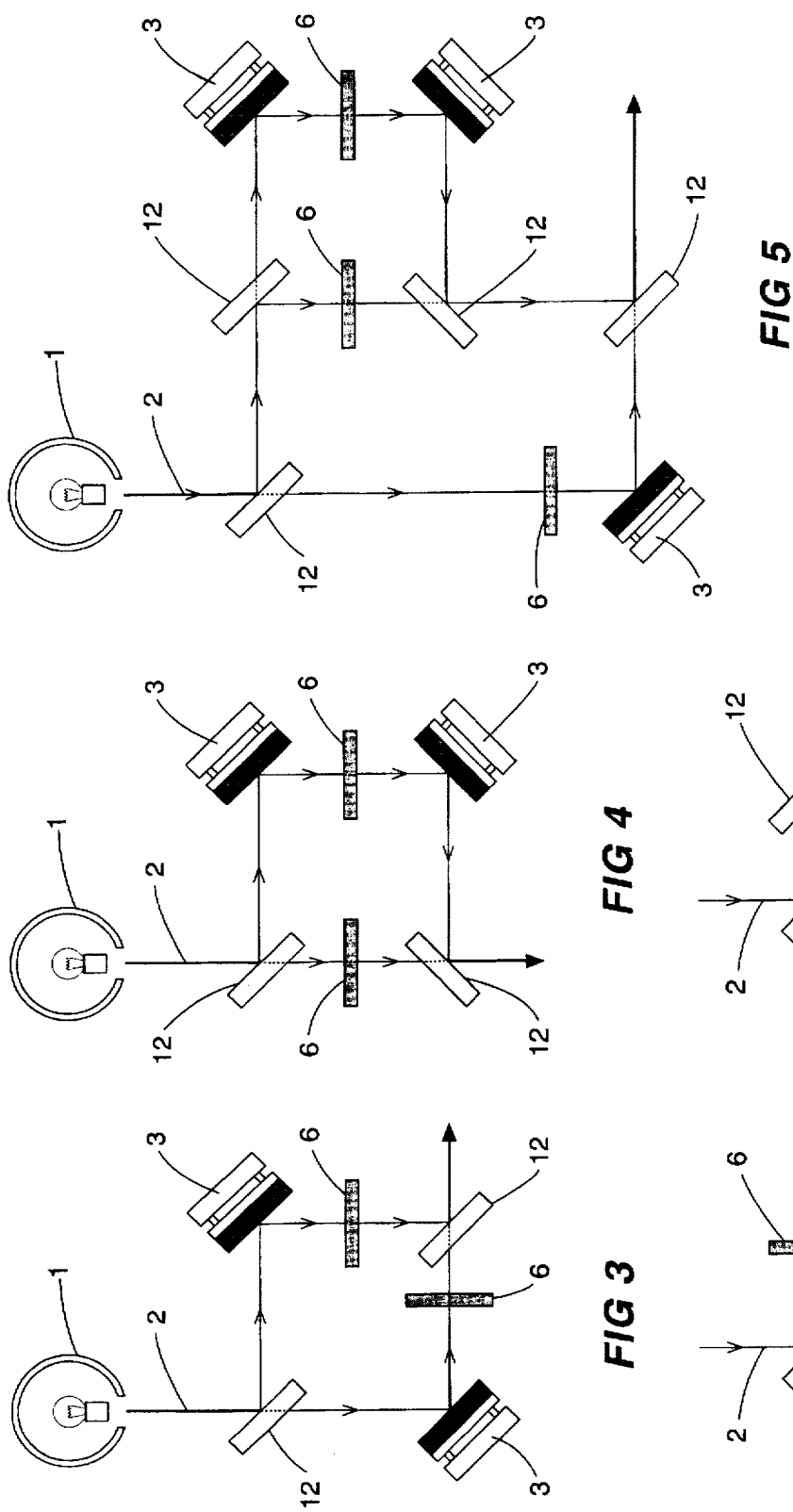

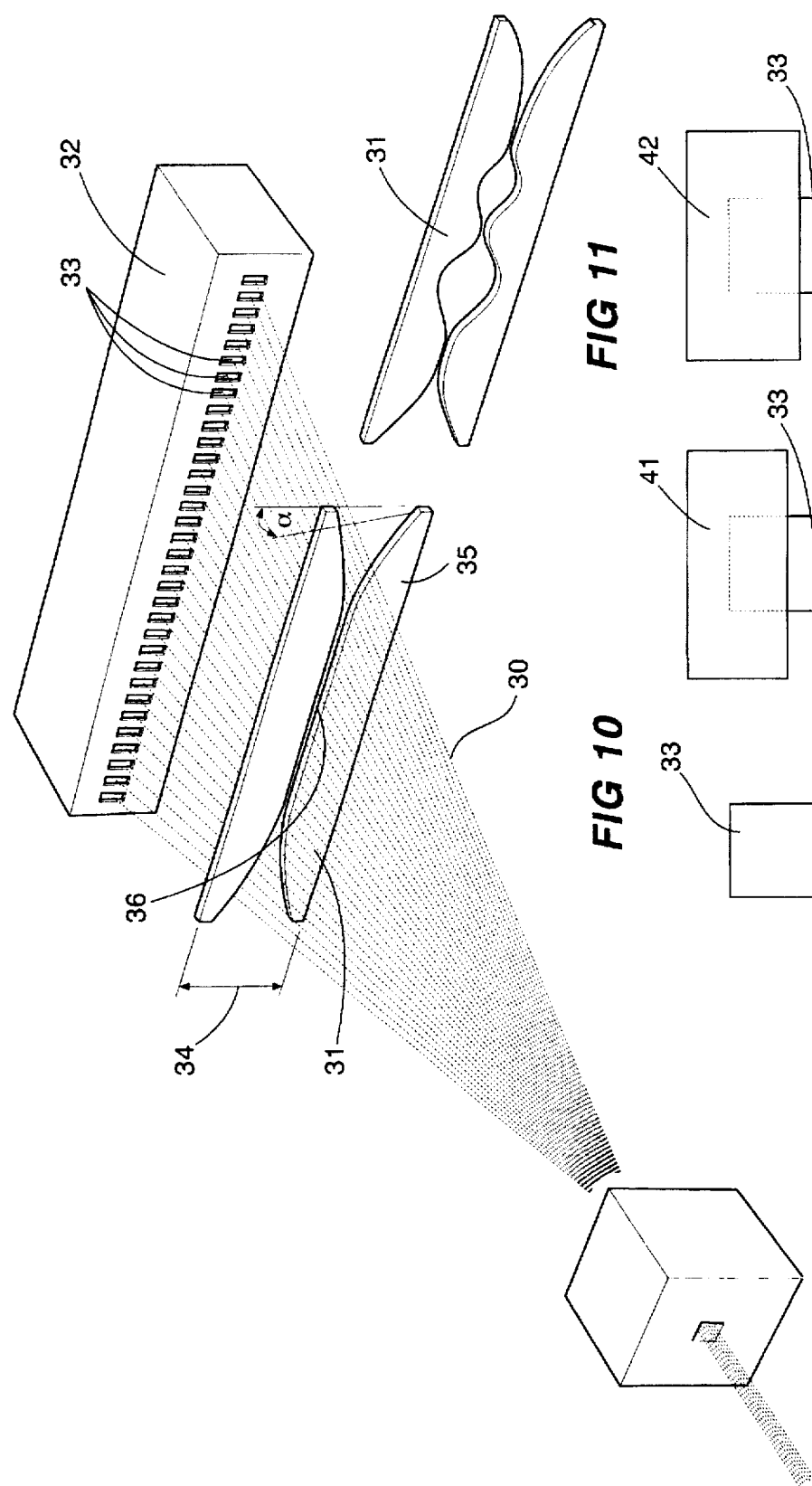
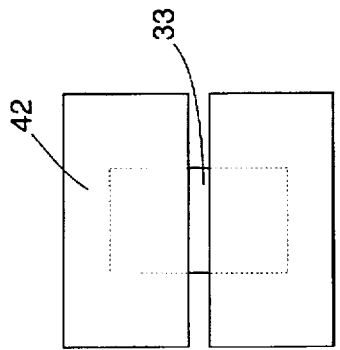
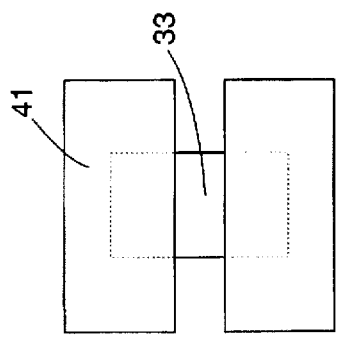

BROAD SPECTRUM SPECTROMETER APPARATUS

This invention is for a method and apparatus which enables one to measure a spectrum band of an electromagnetic source by modifying the intensity of electromagnetic radiation to take into account numerous variables such as the variation in spectral intensity, the variation in transmission characteristics of particular wavelengths through the spectrometer apparatus, and the wavelength response of the detectors used.

BACKGROUND OF THE INVENTION

A spectrometer is an instrument which is used to measure the wavelength or energy distribution in a heterogeneous beam of electromagnetic radiation. The spectrometer may be used to examine a light source, it may be used to examine the reflectance characteristics of an object illuminated by the light source, or it can be used to measure the absorption characteristics of material when illuminated by a light source, but to name a few uses.

In the measurement of the various interactions of electromagnetic radiation and sources it is thus quite common to use a suitable source of electromagnetic radiation which provides radiation through a range of wavelengths. For example, one of the more desirable spectral range is between the ultraviolet (UV) and the infra-red band (IR).

In particular situations, such as when analysing absorption spectra, the light source must therefore provide a range of wavelengths in which the measurement is to be made. Thus if the absorption radiation spectrum of interest is in the UV an IR source is obviously of no use and one requires a UV emitting source.

In some instances, it may be desirous to have a wide spectral range measurement, whether for absorption or other. In these circumstances one may use wide band sources, examples of which are Xenon lamps, quartz tungsten halogen lamps, and others that typically emit electromagnetic radiation which ranges from the UV to the IR.

Traditional spectral analysis instruments, such as spectrophotometers, include a diffraction grating or prism positioned before the detector used to measure the electromagnetic radiation. These types of spectrometers can select a narrow band of radiation and shine it onto the detector thus enabling the detector to measure the intensity of that radiation in that narrow band only.

A complete spectral picture can then be built by rotating the diffraction grating or the prism, known as a tuning element, or moving an interference filter in place of the spectrometer. This effectively scans the spectrum of radiation across the detector and enables one to measure the transmitted intensity over a relatively wide range of the spectrum.

This technique has been employed for a number of years, quite successfully, and as mentioned above is used to measure the spectrum of radiation, for uses such as absorption spectrometery, fluorescent spectrometery, or reflectance spectrometery.

Thus these techniques manipulate the electromagnetic radiation which falls onto a detector by moving the spectral tuning mechanism so as to scan the spectrum of interest across that detector.

This, however, can be quite time consuming and certainly does not provide the complete results of the spectrum of interest until the scan has been completed. To overcome these problems spectrometers have now been constructed by using a new type of detector which in fact is an array of individual detectors, this made possible by advances in other physical and engineering sciences.

These detectors are know as diode arrays or charge coupled device detector arrays (CCD) and the like.

These CCD systems allow the detector array to instantaneously, or at least in real time, measure a spectrum band and do not require scanning or tuning of the spectrometer across a single detector. This is because the intensity values at many wavelength bands of the spectrum on the multiple individual detectors are distributed along the spectrum as dispersed by a spectrometer.

An additional advance in the use of spectrometers has been to use fibre optics which couple the CCD array spectrometers.

These spectrometers fairly instantaneously and simultaneously analyse spectrum ranges of around 500 nanometers in the visible region; a typical CCD array spectrometer which uses a 1024 element CCD detector array can scan across the IR, visible and up to the UV range. Thus the range covered may be from 300 to 800 nanometers (300–400 being the ultraviolet, 400–700 being visible and 700–800 being in the near infra-red region). In different spectral regions very different ranges may be relevant.

For simplicity these spectrometers may use optical fibre techniques in both the output and input of light that is, for example in cases of absorption measurements, the optical fibre is used to transmit relevant electromagnetic radiation to a sample material being tested, whilst another optical fibre is used to transmit the electromagnetic radiation from the sample to the array of detectors via a spectrometer.

This has now provided a whole new range of relatively inexpensive, fibre optically coupled spectrometers utilising CCD detector arrays which can be controlled by personal computers not only to control the instrument but for data acquisition and subsequent analysis.

But all spectroscopic instrumentation suffer from the basic flaw regardless of their design in that at least some of its component parts have a non-uniform wavelength response. This is compounded by the fact that the non-uniform response of many of these components have in fact the basic same trend. At UV and near infra red extremes of the spectrum the response may be up to a factor of 10 lower than that at visible wavelengths. Thus when this is combined into a system of complexity which is typical of standard spectroscopic instruments, the spectral response may span 3 or more orders of magnitude.

With the introduction of CCD array detectors, as discussed above, this problem of non uniform response is greatly amplified. As spectrometer equipped with a CCD array would have an extremely limited dynamic range at any single wavelength to be able to achieve a singular polychromatic measurement, that is, the detector must accommodate the wide range of signal intensities due to the spectrometer's non-uniform response. This thus leaves a relatively small range over which the sample concentration or absorbence can vary and yet still be detected.

Using CCD array spectrometers with common and currently available light sources therefore leads to a number of problems.

Firstly, the sources do not produce electromagnetic radiation spectra which are optimal for detection. As a typical example, the quartz tungsten halogen illumination lamp can provide electromagnetic radiation between 250–750 nanometers, in the UV to the NIR regions. Coupled with this may be the 1024 element CCD detector within a wavelength dispersive spectrometer as described above. A particular problem with this detector/source combination is that both the light source intensity and the detector sensitivity decrease rapidly as one moves from the near infra-red, through the visible, to the UV part of the spectrum, and in addition, the grating reflection efficiency peaks at some blaze wavelength and decreases as one moves away from this wavelength.

Furthermore, optical fibres are not uniform in their transmission characteristics and it is found that the transmission of radiation through the optical fibre in the visible and NIR is much greater then in the UV. Therefore, the characteristics of the detector, the source, and the fibre optics, all lead to suppressing UV radiation, and the diffraction grating used in the spectrometer adds further divergence from a flat response.

In addition, whilst detector sensitivity decreases as one moves from the NIR to the UV i.e., they have maximum sensitivity in the NIR, detectors also have a limit to the intensity that they can in fact measure and beyond which they saturate. Therefore their dynamic range is finite.

In such spectrometric systems, with a light source being a quartz tungsten halogen lamp, the detector being a spectrometer with a CCD array, and the coupling mechanism an optical fibre, the effective intensity of the illuminating light or electromagnetic radiation varies dramatically as one moves from the NIR to the UV end of the spectrum.

For example, in a real measurement situation, there could be an intensity of illumination three orders of magnitude greater at 500 nanometers than at 300 nanometers and 800 nanometers, and even more when compared to 250 nanometers. As that is 1000, (3 orders of magnitude) close to the dynamic range of the instrument, it is impossible to undertake simultaneous measurements in the UV and the NIR bands with useful signal to noise levels across the spectrum.

Therefore, the overall instrument sensitivity is dependant on a number of components such as the following:

1. Light source intensity spectral distribution;
2. Fibre optic transmission variation;
3. CCD array detector spectral variation in quantum efficiency;
4. Spectrometer and filter transmission curves;
5. Diffraction grating efficiency curve;
6. The transmission/reflectance curves of any other intervening/coupling optics; and
7. Chromatic, spherical and any other induced aberrations, such as reflective, as in spheric mirrors, or refractive as in lenses, and in focussing or collimating optics within or outside of the spectrometer or dispersive section.

Thus in empirical measurements, the current architecture of the spectrometers lead to common detection problems, in that in certain portions of the spectrum the detectors saturate whilst in others the signals that are received are buried in noise so as to be unresolvable.

Currently, in the case of monochromatic scanning spectrometers, the question of non-uniform response is overcome quite simply by taking a full spectrum measurement with no sample present. This measured spectrum then is a measure of the non-uniform response of the instrument itself and is commonly referred to as the baseline. Subsequent sample measurements are then baseline corrected in order to restore the instrument's full dynamic range. Simply put, a measurement is made at each wavelength and the detector scan is adjusted to compensate for the instruments response thereby simulating a uniform response.

Polychromatic instruments that use either CCD or photodiode array detectors are unable to employ baseline correction since they have no fixed scan detector elements, i.e. all pixels have a common measurement integration time. To achieve an acceptable measurement dynamic range these instruments employ either a detector array with an enormous inherent dynamic range or multiple exposures where an initial short exposure is made to locate and measure any strong signals followed by as many as two longer exposures to accurately measure intermediate and weak signals. However, the latter whilst overcoming the dynamic range problem does not measure all spectral details simultaneously and defeats the purpose of such an instrument.

This invention attempts to overcome at least some of the above-mentioned problems and to provide a means for measuring the intensity of electromagnetic radiation across a spectrum at comparable levels of signal to noise, or background.

This is principally achieved by attenuating the light source intensity either prior to the light source reaching the sample, or inside the spectrometer after dispersion prior to the dispersed light reaching the detectors whilst at the same time taking into account the particular properties of the spectrometer and the detectors.

Thus the light may be attenuated prior or post dispersion, this depending on the application at the time.

SUMMARY OF THE INVENTION

In one form of the invention though this need not be the only or indeed the broadest form there is proposed an apparatus for analysing the intensity of electromagnetic radiation from a sample including; a dispersing spectrometer in combination with a light source; said light source being adapted to illuminate the sample whose spectral properties are to be measured, the light from said sample being adapted to be directed into the dispersing spectrometer including a detector array comprising a number of detectors adapted to measure the intensity of the dispersed light; wherein the apparatus further comprises an element adapted to cause the dispersed light reaching the detectors in the detector array to be modified in intensity across the spectrum to give a response over all the detectors of the detector array within their dynamic range.

In a further form of the invention, there is proposed an apparatus for analysing the intensity of electromagnetic radiation including a spectrometer in combination with a light source, at least one first optical element adapted to direct a desirable pattern of the light source onto a material whose spectral properties are to be measured, at least one second optical element adapted to direct the light source from the sample into a dispersive spectrometer with a detector array, and one or more third elements adapted to modify the light so as to result in the intensity of the dispersed electromagnetic radiation (spectrum) reaching the detector array to give a response over all elements of the detector array within their dynamic range.

In a preferred form of the invention the third elements are optical elements that attenuate the light prior to it being dispersed by the spectrometer.

In a further preferred form of the invention, the third elements are either optical or mechanical elements adapted to selectively attenuate the intensity of dispersed light within the spectrometer prior to it reaching the detector array.

In preference, the light source is one which has a range of wavelengths, preferably emitting from the near infra-red through the visible to the ultraviolet regions of the electromagnetic spectrum.

In preference at least one of the first optical elements adapted to direct the radiation of the source includes an optical fibre adapted to direct the radiation to a sample to be analysed by the spectrometer.

Preferably, at least one of the second optical elements adapted to direct the radiation from the sample to the detector array also includes an optical fibre.

So as to attenuate the light which finally does reach the detector array, the third attenuating optical element or elements is/are preferably positioned in between the light source and the sample or between the sample and the spectrometer input, or inside the spectrometer after the dispersing elements.

In preference the third attenuating optical elements are designed to attenuate the light source or the dispersed beam so that the resulting intensity on the detectors is one that gives substantially uniform electrical or other response per detection element across the spectrum. That is, the third optical elements take into account the spectra intensity of the light source, the optical fibres, the dispersing element efficiency and the spectral reciprocity of the detectors.

In preference the response of the detector array is within several orders of magnitude across the spectrum, and certainly less than would be required if the techniques mentioned above were not used.

It is preferable to use selective dichroic mirrors and optical filters to attenuate the light source intensity in inverse proportion to the convolution of effective intensity, spectral output of the light source, detector response, fibre optics transmission, and dispersive element efficiency, and any other intervening optical effects, such as chromatic or spherical aberration that modify the spectral transmission intensity of a broad band signal.

The above arrangement allows there to be a relatively flat response across the spectrum by preferably heavily modifying the illumination spectra, and/or the spectral transmission of the spectrometer.

In addition, there are preferably yet further optical elements adapted to align the intense position of a source to the relatively small aperture which is the size of an optical fibre aperture. This usually requires the use of at least one XY adjustable mirror so as to ensure that the fibre is properly illuminated and that the spectral measurement has a wide dynamic range and sensitivity.

In preference there are physical attenuators such as slits which attenuate the dispersed light prior to reaching the detectors by physically linking the size of an aperture in a varying fashion through which the light has to pass to achieve the necessary relative spectral attenuation.

In a further form of the invention there is proposed a method for analysing the intensity of electromagnetic radiation from a sample comprising the steps of; using a light source and at least one first optical element to illuminate the sample with desirable light; passing the light from the illuminated sample into a dispersing spectrometer using at least one second optical element; passing the dispersed light from the spectrometer into a detector array comprising a plurality of detectors; wherein there is at least one third element that is used to selectively attenuate the light so that the resultant electromagnetic radiation falling onto the detector array gives a response over all the detectors of the detector array within their dynamic range.

Ideally, the third element is only one element and has a particular spectral modification property. It may be constructed from a number of different known elements, such as but not limited to:

a) A special spectrally active optical filter positioned in front of the light source, or prior to the light reaching the dispersing element. This may be a single or a composite mirror.

b) A special dichroic, spectrally selective mirror, that selectively reflects some regions of a spectrum whilst transmitting others, positioned in between the light source and the dispersing element.

c) A custom linearly varying neutral density filter attenuator that can be inserted inside of the spectrometer and positioned after the dispersing element and before the detector array to selectively attenuate the various sections of the dispensed spectrum.

d) A linearly varying slit, such as an elongated aperture of changing width, the narrowest sections allowing least light to get through, whilst the wide sections allowing all of the light to get through, thereby selectively attenuating particular regions of the spectrally dispersed light inside of the spectrometer before it reaches or falls onto the detector array.

e) An electronically tunable filter or shutter, such as liquid crystal array.

Conceivably, any of the above five elements could theoretically be successfully used to uniquely attenuate a spectrum either prior or post dispersal to achieve the perfect inverse function of the convolution of the source spectrum, the fibre optical transmission spectrum, the dispersive element spectrum, the detector spectral response, and any other relevant dispersive effects such as chromatic aberration in lenses that can spectrally modify the system response to give a flat response across the spectrum.

Most optical systems seek to eliminate aberrations whether chromatic or spherical. This invention also recognises the possibility of utilising the adverse effect of aberration. For example, when focusing with a lens not corrected for chromatic aberration into a small aperture, perhaps the core of an optical fibre, one could position the aperture at the focal position for ultraviolet light. This results in the visible and near infra red light focusing at a different focal length (longer) and meeting the fibre aperture defocused and therefore be much less optically coupled then the UV and thereby creating differential spectral attenuation favouring the weaker UV light.

Another variation comes about when an integrating sphere is used with and as part of a light source to give a spatially uniform illumination source for any reflectance measurements. Such integrating spheres are currently coated with white paint or some other spectrally neutral coating.

An integrating sphere, or other diffuser, would be used in this invention by painting the diffusing surface of the integrating sphere or diffuser, with a suitable material, usually paint, a particular colour such as for example blue, thereby reflecting blue but absorbing to varying degrees the rest of the visual spectrum. This would then greatly enhance the blue wavelength range and attenuate the others to achieve a closer approximation of spectrally flat response from the apparatus as a whole.

Ideally, whatever the attenuation mechanism, only one element need be used. The uncorrected inverse instrument response can define the precise response of a single element that would make the perfect correction. For practical purposes, since it is very difficult or nearly impossible or too expensive to obtain the exact or precise single element that attenuates the spectrum to the requested specification, this invention envisages using several of the aforementioned elements to achieve the desired flat response, whether it be several of the same, or several different elements or any combination thereof.

The above is especially true if one considers that there is a wide range of electromagnetic radiation sources, optical fibres, dispersive elements with varying efficiency, lenses and mirrors of varying aberration, and variable detector spectral response, that can combine to produce a wide range of requirements.

Although there are a number of off-the-shelf elements available that can partially approximate the desired attenuation it is highly unlikely that any one would be sufficient for a particular requirement. For example, if any optical filter were to be used to produce the correct attenuation, one may need to adapt a standard thickness filter by changing its thickness, or combining it with other optical filters which may also require an adaptation in thickness to achieve the correct response.

If one could achieve perfect spectral correction this would leave the ideal full dynamic range of all the detector array elements available for measurement with identical response across the detector array.

Since, as mentioned above, a perfectly flat spectral response is rarely practical to achieve using only one of the standard optical elements, the task of spectral response attenuation would need the combination of at least several such elements to approximate perfect correction. Various such schemes are discussed elsewhere in this specification.

However, there may very well be created a unique, single optical element with the unique characteristic that inverts the normal system response function. Such elements are ideal and may be quite cost-prohibitive and it may be overall more desirable to use a combination of know elements, but there may well be situations where a one-element attenuation will be the preferred option such as when a large quantity are required to be made and costs proportionally reduce.

Even where a single or multiple elements are used to compensate for the specific spectral response of a system, it may be desirable to be able to add additional elements. Consider, for example, the situation where a spectral shift of say 50 nanometers may be required. Rather than changing the single, unique custom element, a new minor element, of low cost, may be introduced to adequately modify the spectral response to keep it within acceptable boundaries of variations.

The acceptable boundaries may be up to 5 times the average response and down to 0.2 times the average response. Obviously it these could be reduced to the better, with the ideal of +/-0%, although this is in practice not currently achievable due to variation between detectors and filters, even when made in the same batch.

There are currently no filters that are made specifically to correct the response of a detector array in the required manner in complex spectral intensity measuring systems. Thus filters must be purpose-built and are usually complex, or must be built as combinations. Alternatively, one may approximate the ideal response by a complex combination of standard, readily available filters and apertures.

For some particular applications a standard filter (currently available) may have the required characteristics, and will be used for the purposes defined in this invention, but this is the exception and is simply fortuitous.

There may very well be situations where one standard element is enough to achieve the necessary response, but this may be quite rare owing to the wide range of system requisites across the electromagnetic spectrum.

BRIEF DESCRIPTION OF THE DRAWINGS

To further aid in the description of the invention reference will now be made to the preferred embodiments or figures wherein:

FIG. 3 shows another schematic diagram of a preferred embodiment as in FIG. 2 but where both beams are modified by the use of filters prior to recombining and prior to light dispersal;

FIG. 4 shows another schematic diagram of a preferred embodiment as in FIG. 3 but where only one beam is attenuated by the use of dichroic mirrors;

FIG. 5 shows another preferred embodiment as in FIG. 3 but where the beams undertake a more complex path prior to recombining and which may be used when multiple dichroic mirrors and filters may be required;

FIG. 6 shows a simple arrangements of optical elements designed to selectively attenuate an electromagnetic spectrum prior to dispersal of light;

FIG. 7 shows another simple arrangement of optical elements designed to selectively attenuate an electromagnetic spectrum prior to dispersal of light;

FIG. 10 is a perspective view of the invention attenuating a spectrum but after dispersal of the light by use of a slit;

FIG. 11 is a perspective view of a variable intensity slit as used in FIG. 10;

FIG. 12a–12c are yet other preferred embodiment of the invention showing selective masking of the surface area of a detector, resulting in attenuation without reducing the well capacity;

DESCRIPTION OF THE PREFERRED EMBODIMENTS

Figure 1:
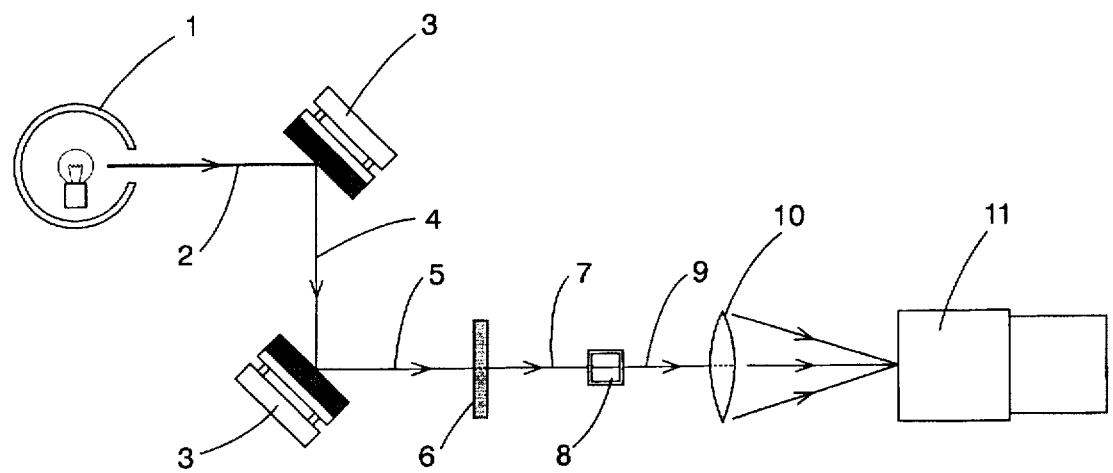
FIG. 1 shows a schematic diagram of a simple adaptation of the invention by using a large source and dichroic mirrors to selectively enhance or diminish the spectrum of illuminating light prior to dispersal.

Turning now to the figures in detail there is shown a light source 1 which emits electromagnetic radiation 2 which then illuminates a dichroic mirror 3, a dichroic mirror being a wavelength or spectral band selective mirror in that it reflects a predetermined percentage of a particular band of spectral energy whilst transmitting a predetermined percentage of other spectral energy.

Thus there may be dichroic mirrors which are adapted to reflect 90 percent of ultraviolet radiation whilst only 10 percent of visible and infra-red, that is, only 10 percent of the ultraviolet radiation is transmitted through the mirror whilst 90 percent of the visible and infra-red is transmitted through the mirror, the rest being reflected.

Therefore, in FIG. 1 dichroic mirror 3 reflects a desirable percentage of a particular spectral band while transmitting the other, the transmitted part taking no further part in the spectrometer. The reflected radiation 4 which has now been attenuated in a particular spectral range illuminates another dichroic mirror 3 which may be adapted or chosen to reflect a certain band of spectral energy and transmit another. If the mirrors are substantially equivalent that means that radiation beam 5 will have an intensity of 1 percent visible and infra-red and 81 percent ultraviolet as compared to initial radiation 2.

The attenuated radiation 5 may then pass through optical filter 6 which may be also used to attenuate a particular range of wavelengths, or simply attenuate the spectrum as a whole. The attenuated and filtered radiation 7 then illuminates a sample 8, the radiation re-emitted by the sample 9 passing through suitable optics such as lens 10 so as to collimate the light onto spectrometer 11 with a detector array.

Figure 2:
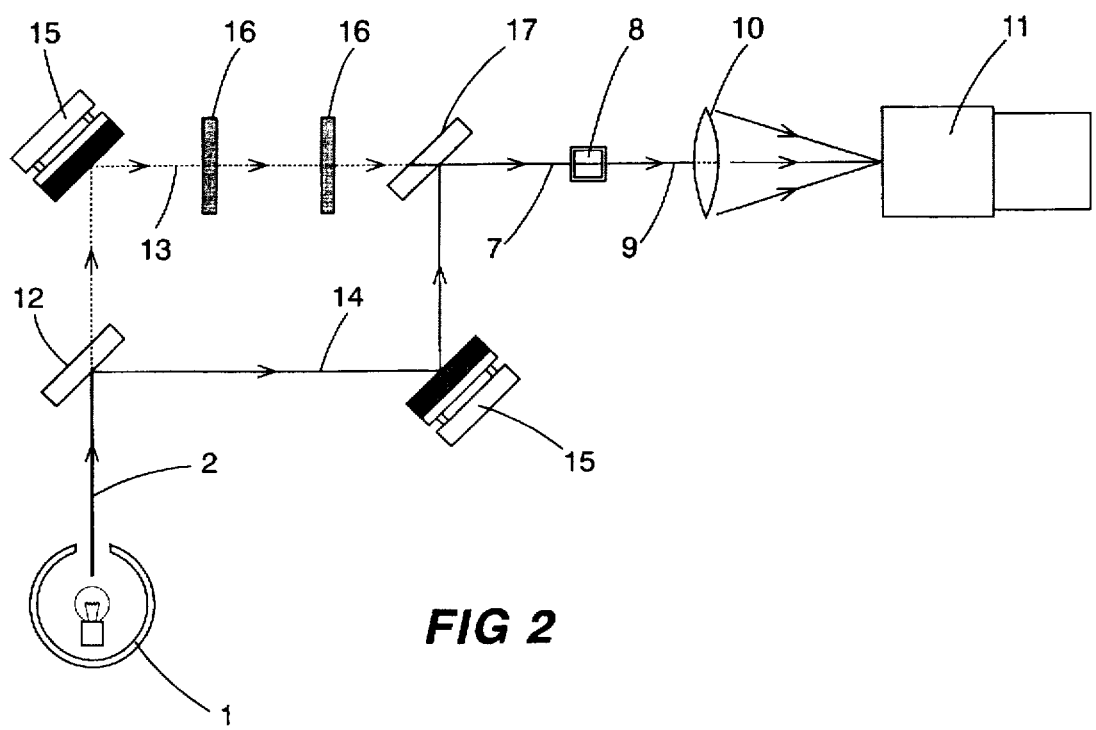
FIG. 2 shows another preferred embodiment but where the light attenuation is accomplished by the dichroic mirrors splitting the beam into two beams of different spectral content, attenuating or modifying these two beams with filters and then recombining them to a single beam prior to dispersal.

FIG. 2 shows essentially the same principal as FIG. 1 with the difference that a mirror 12 is used to separate the beam 2 into two beams 13 and 14 each of which then go through a mirror 15. In this case beam 13 may contain 90 percent of the visible and infra-red and 10 percent of the UV as compared to beam 2 whereas beam 14 contains 90 percent of the ultraviolet and 10 percent of the visible and infra-red radiation as compared to beam 2. Mirrors 15 may have particular spectral reflectance/transmittance properties or be uniform reflectors. The difference between FIG. 1 and 2 is that beam 13 may additionally pass through several optical filters 16 designed to attenuate the particular range of wavelengths present in that beam before the two beams 13 and 14 are again combined by optical element 17 to produce a final beam 7 which is used to illuminate sample 8 whose re-radiated light 9 goes through lens 10 so to illuminate the spectrometer 11. Optical element 17 may in general be the same as dichroic mirror 12, wherein it simply recombines beams 13 and 14.

FIGS. 3 to 7 show other embodiments of the invention, with varying degrees of complexity. Thus whilst FIGS. 6 and 7 are the most simplistic, with the light attenuated by appropriate filters and mirrors whilst still only one beam, FIGS. 3-5 shown the attenuation of the light when separated into several beams, with FIG. 5 going one step further and showing the manipulation of beams when one of the separated beams is itself separated into two further beams.

Figure 8:
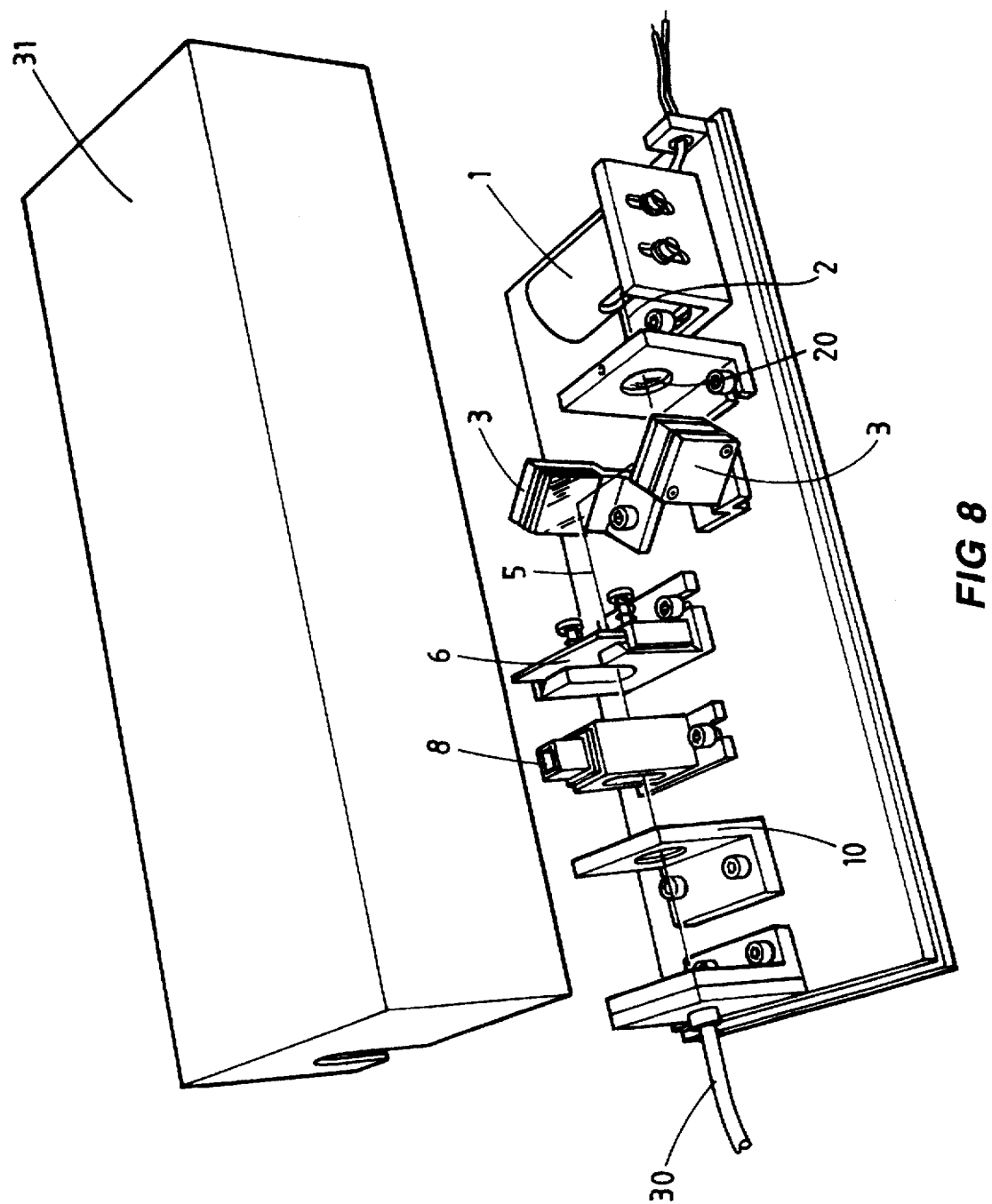
FIG. 8 shows a perspective view of a spectrometer employing the architecture of FIG. 1 for an absorbence spectrometer.

FIG. 8 shows a perspective view of a typical spectrometer showing light source 1 whose radiation 2 is collimated by lens 20 before impinging on dichroic mirrors 3, the radiation 5 passing through optical filter 6 and then onto sample 8 and through lens 10 but instead of going to a detector as in previous embodiments it goes to an optical fibre 30 which then leads to the detector (not shown). The whole spectrometer can be enclosed in suitable box 31 and there may be further modifications to the box (not shown) so as to allow the insertion of a sample into the box without requiring the whole lid or box 31 to be removed.

Figure 9:
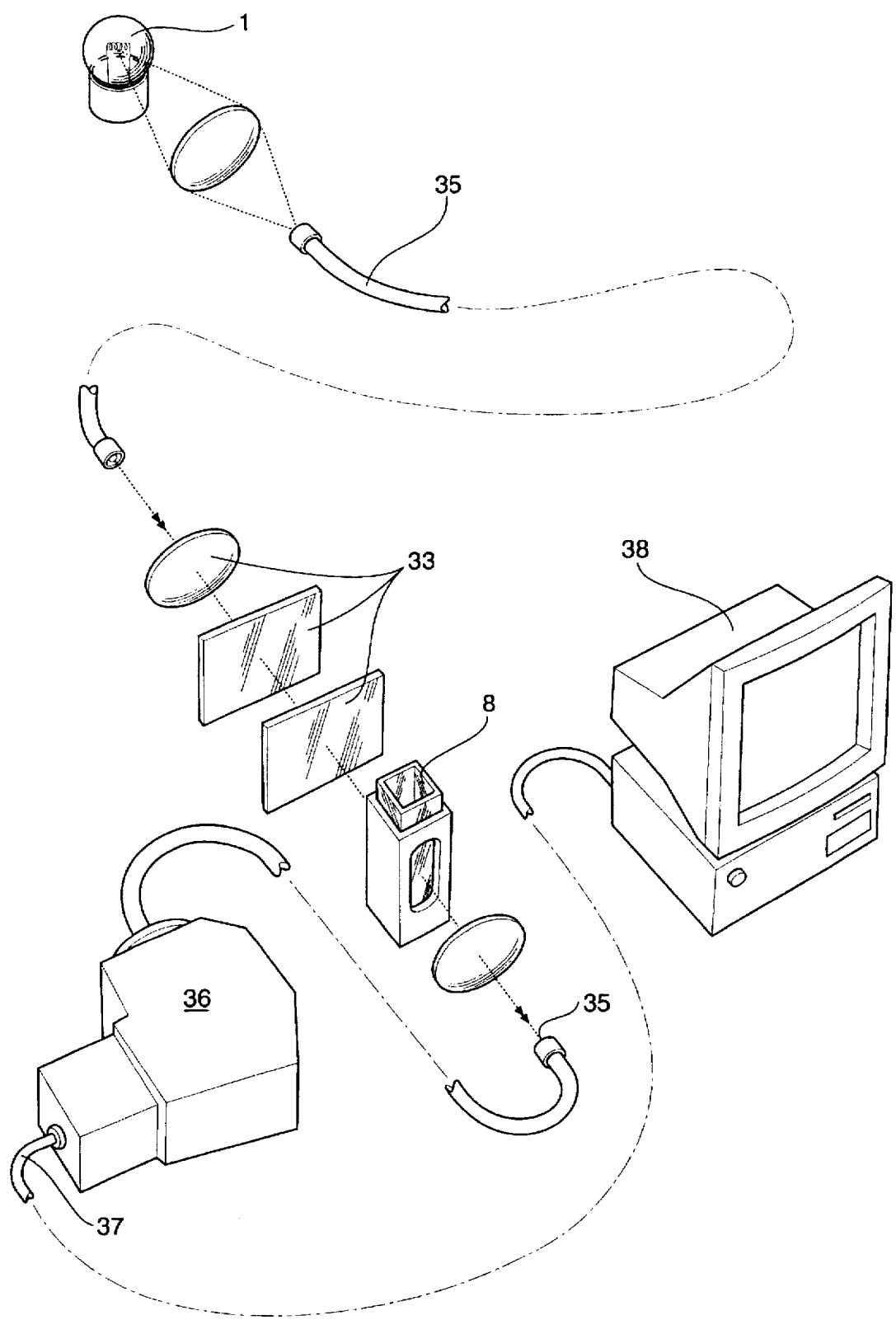
FIG. 9 shows the use of fibre optics in a typical preferred embodiment of the spectrometer.

FIG. 9 shows the use of the spectrometer when an optical fibre 35 are used to transmit radiation from the source 1 prior to passing through optical elements 33 designed to attenuate the light intensity prior to illuminating sample 8 whose re-radiation is then fed into another optical fibre 35 which then leads to the spectrometer detector array 36 and whose output goes via electric connection 37 to a personal computer 38 designed to collect, analyse and display the spectral data. There are usually at least two optical lenses to relay the light so as to ensure that the light impinging on the fibre optic does so in the most efficient manner. These are however not shown in FIG. 4.

FIGS. 10-12 show the use of the invention where the attenuation is performed after the light has been spectrally dispersed. Thus, in FIG. 10 the spectrally dispersed light 30 has to pass through a slit 31 before reaching detector array 32 composed of individual detectors 33. Slit 31 is designed so as to be of variable size in the vertical 34 (or direction perpendicular to the spectral spread). Thus if we assume that the dispersed light at edge of spectrum 35 is UV whilst the middle of the spectrum 36 is in the visible range, then by assuming that the spectrum is of uniform intensity in its vertical 34 the visible light reaching detectors 33 is of much more attenuated intensity than that of the UV. If the visible light is initially of much greater intensity than the UV this slit will have the effect towards changing their relative intensities.

In addition, for practical purposes, the slit must either be constructed of non-reflecting material, or it must be tilted at some angle alpha from the vertical so as to minimise backscattered light being reintroduced in the spectrometer optical path.

FIG. 11 shows a slit with a changing attenuator characteristics. One may also construct a slit whose width is variable along its longitudinal axis so that attenuation could be effectively tuned.

Another alternative can be seen in FIG. 12 where (a) shows an individual unobstructed detector 33, (b) shows a partially masked detector 33 by using make 41 and (c) shows a detector 33 being almost completely masked by mask 42, the masking having the same physical effect as the slit of FIG. 10 but being located at the detector and not earlier within the optical path. Of course, there may be difficulties in such a construction and lack of variability once so constructed. However, for dedicated applications, where mass production of detectors with fixed masks is warranted, this is likely to be the optimum embodiment of the invention.

Figure 13:
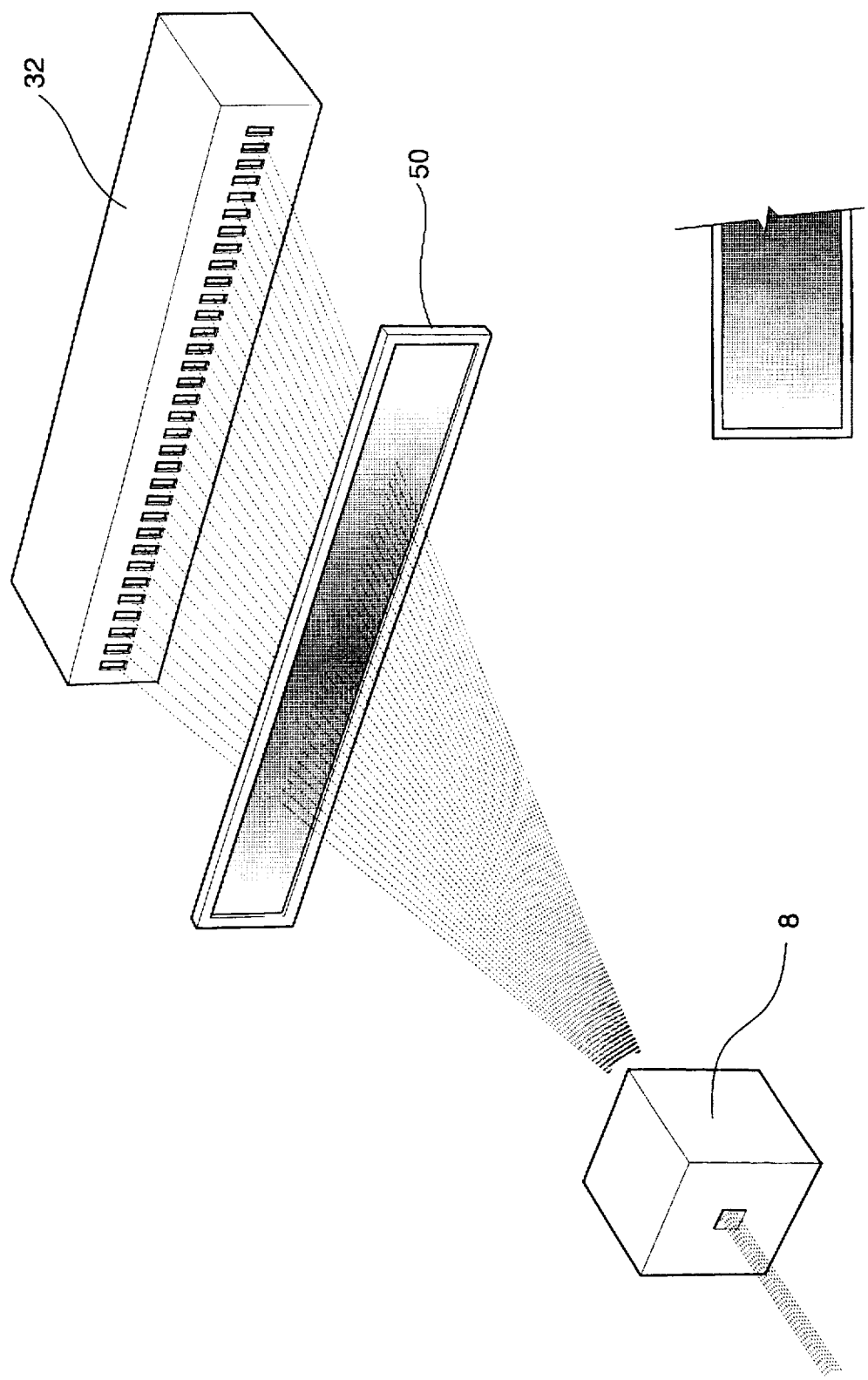
FIG. 13 is a perspective view of the invention illustrating use of an optically active filter or an optically active mirror.

Thus one can see this invention provides the ability to use a particular light source whose intensity in particular wavelengths may be attenuated by the use of suitable optics such as dichroic mirrors and optical filters 50 as seen in FIG. 13. The spectrally active optical filter or the dichroic specially active mirror 50 allows for the dispersed light to pass through either the filter or the mirror where the attenuation varies depending upon the wavelength. This results in the final light which reaches the detector to be as uniform as is required by the dynamic range of the detectors and means that a snapshot of the whole spectrum can be realised at the same time. It is envisaged that particular optical attenuator kits may be used on existing spectrometers by simple substitution of elements to those currently used. Thus there may be particular attenuation packages used for particular light sources and for particular application, such as a source requiring greater illumination in the ultraviolet range as well as taking into account the dynamic sensitivity and range of the detectors.

Figure 14:
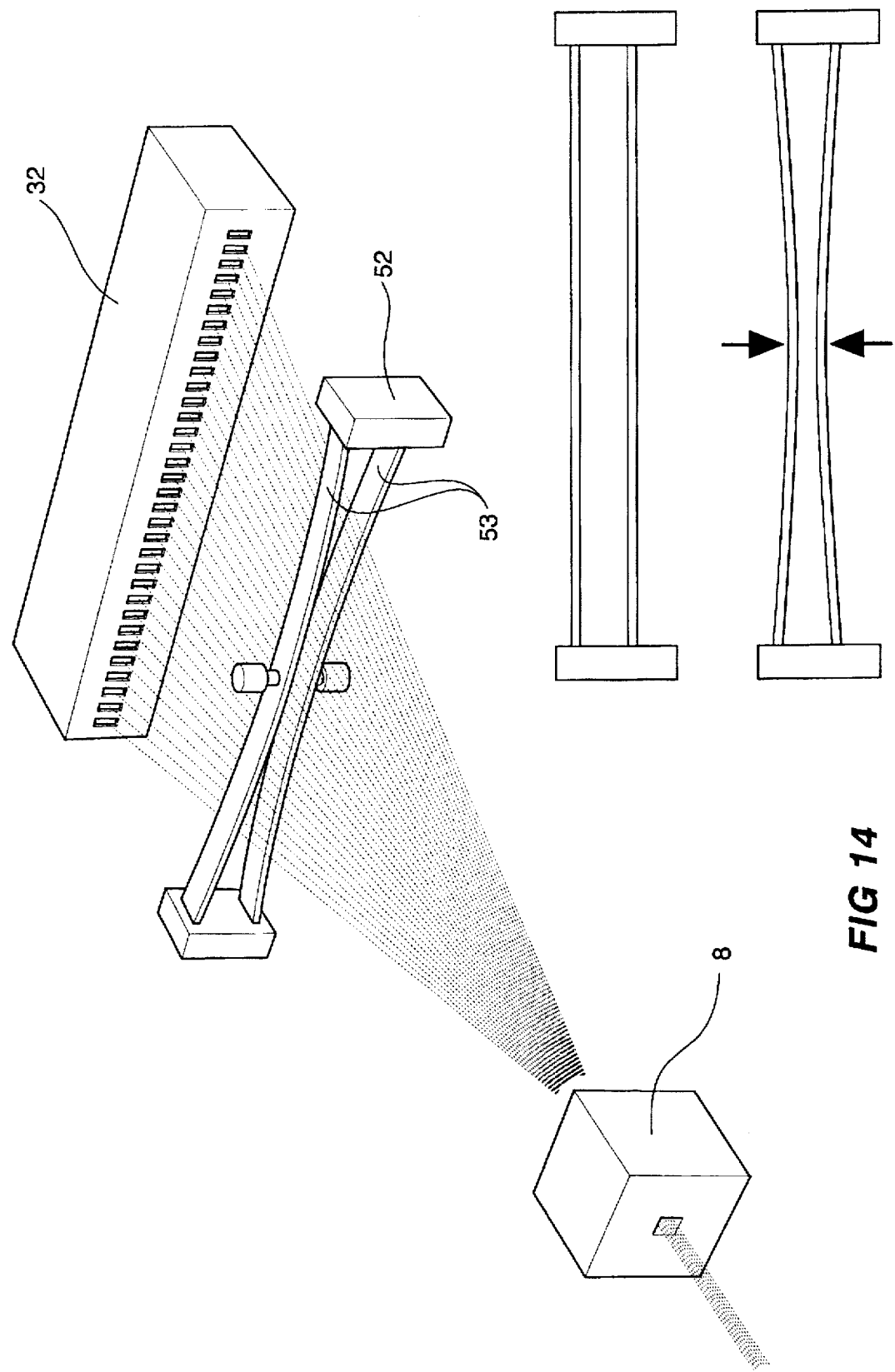
FIG. 14 is a perspective view of a tunable filter or shutter.

A further possible alternative is to be able to use tunable dichroic mirrors, as seen in FIG. 14, that is, ones whose optical reflectance and transmission characteristics are variable whether that be by mechanical or electrical means. An electrically tunable filter 52, as seen in FIG. 14, could simply be a piezoelectric or other type of electromagnetic control which reduces the distance between two sheets or plates 53 and thus physically attenuates the light reaching the CCD detector.

Thus one can see that this invention enables one to use CCD spectrometers with a wide variety of light sources, and therefore can be used for a wide variety of samples to provide spectral intensity information about those samples.

Figure 15:
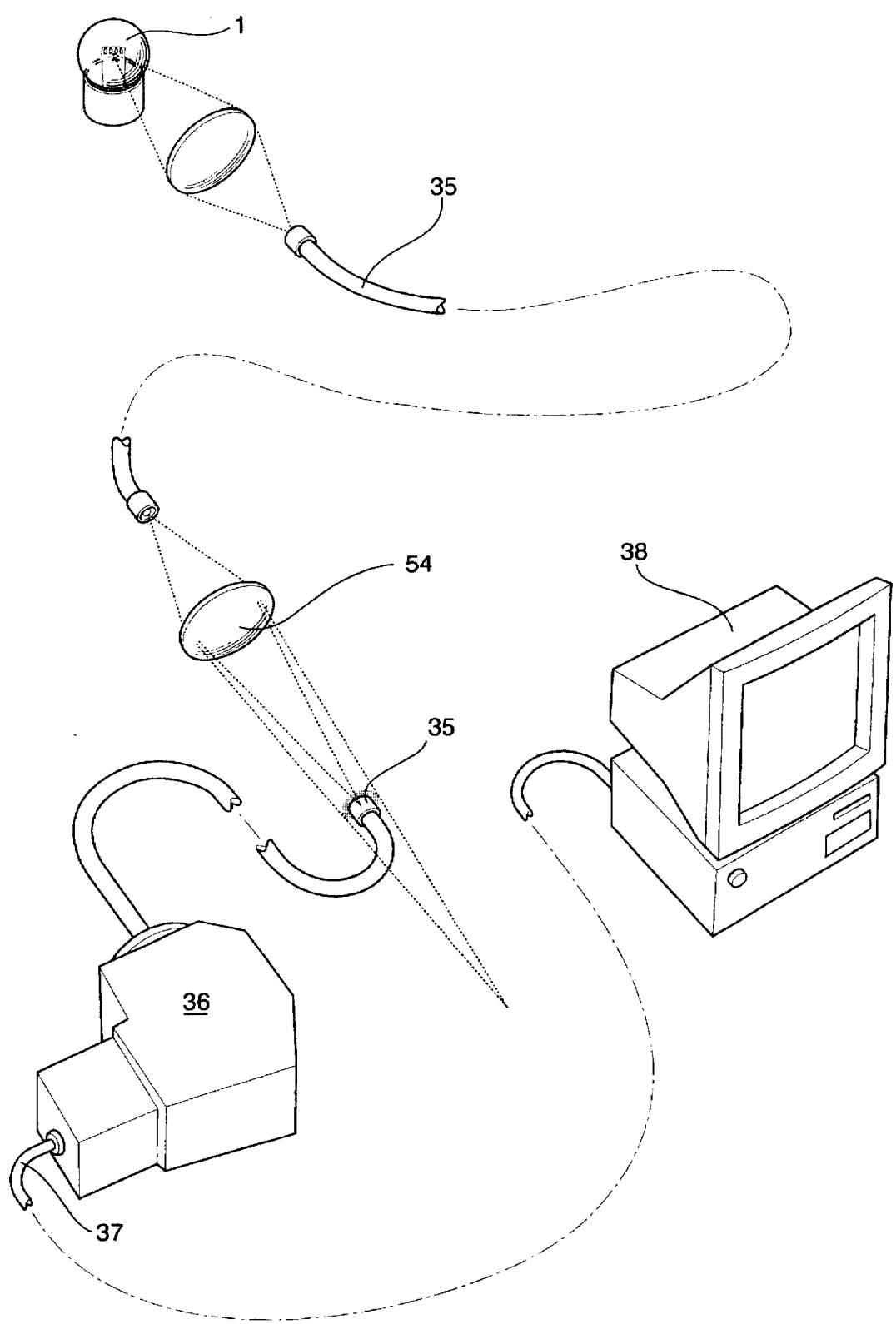
FIG. 15 is an exemplary showing of fibre optics in a typical preferred embodiment utilizing a chromatic aberrating lens.
Figure 16:
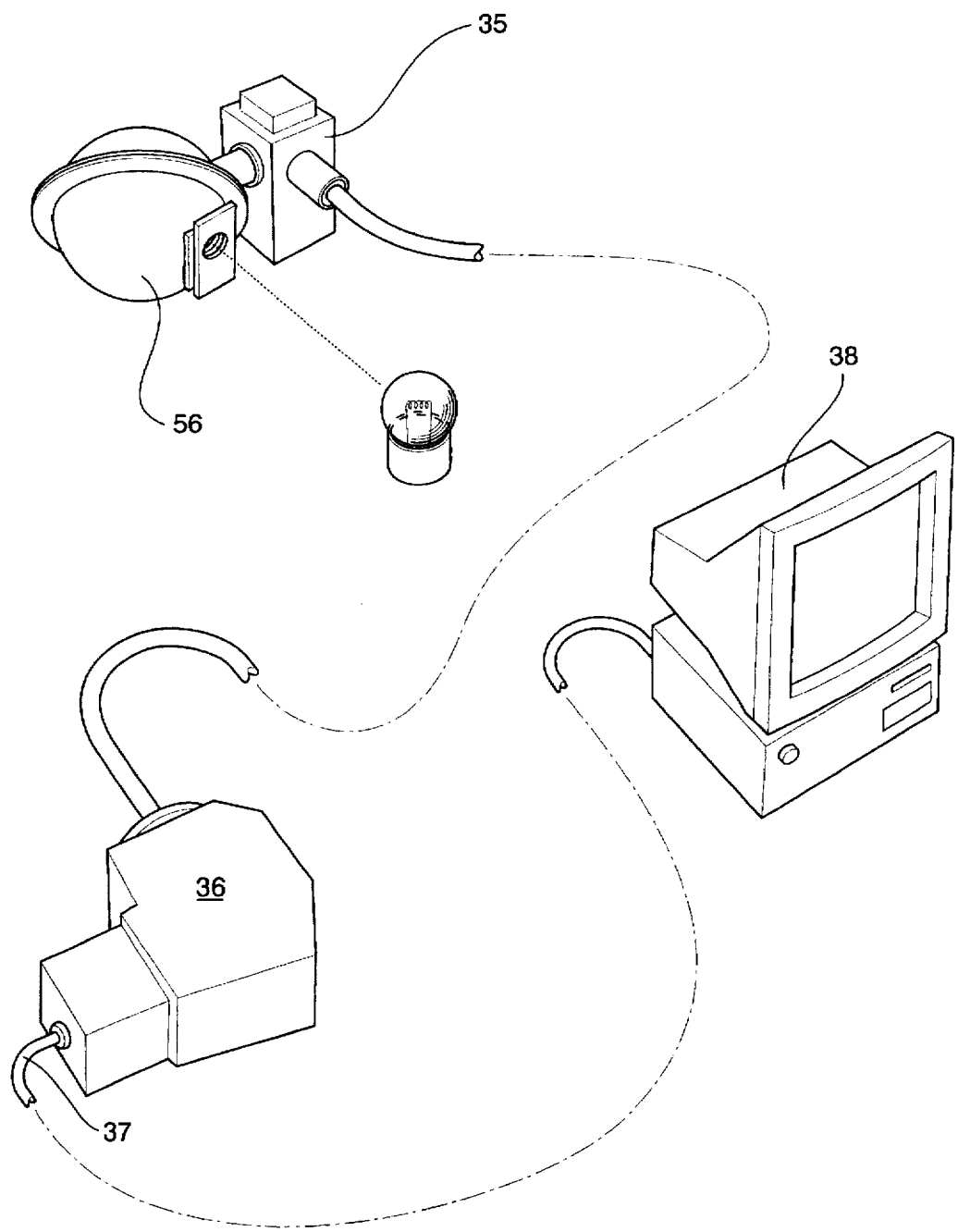
FIG. 16 is an exemplary showing of optical elements in a typical preferred embodiment of the spectrometer showing use of an integrating sphere.
Figure 17:
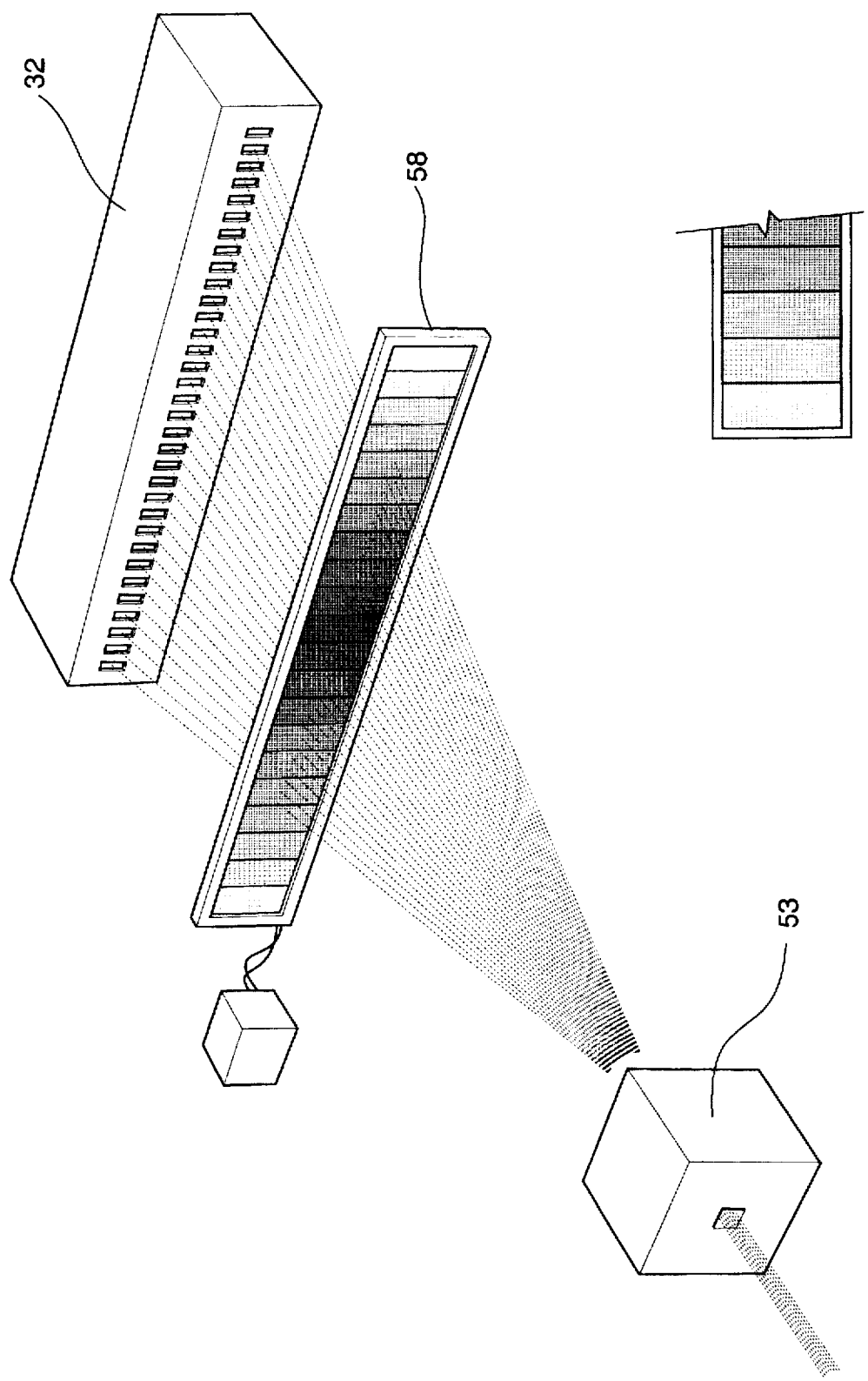
FIG. 17 is a perspective view of the invention showing a custom linearly varying neutral density filter attenuator consisting of individually controllable elements.

This invention teaches one to provide a uniform spectral response from any spectrometer by introducing one or more optical elements whose combined response is the inverse of that produced by the rest of the instruments. This can be formed either pre or post dispersion. In the case of pre-dispersion the correcting components may be chosen from a full combination of optical filters, either purely transmissive or transmissive and reflective as in the case of dichroic mirrors, optical lenses 54 with chromatic aberration as shown in FIG. 15, integrating spheres 56, as shown in FIG. 16, or other diffusers coated with material whose response is wavelength dependent. The post-dispersive application may involve a spatial filter or shaped aperture to partially block the more intense wavelengths. A particular attractive application may be a mask that is directly etched onto the surface of a CCD array detector. Post-dispersive applications may also include custom neutral density filters or variable neutral density filters 58, as seen in FIG. 17.

Whether pre or post dispersive systems are used, this invention teaches the attenuation of intense spectral signals so that the signal to noise ratios are not dramatically altered and may in fact be optimised for weak signals. However a further option may in fact be that some of the wavelengths may in fact be amplified by suitable optical or other means and this invention is not meant to limit to the case of attenuation only.

This invention may also be used in portable or light apparatus that may be movable and thus visible in different applications. It may even be possible to develop hand-held units which may use external light sources, such as the solar spectrum.

Many embodiments will be obvious to the person skilled in the art without deviating from the spirit of the invention and it is not intended that this specification limits the invention to the particular embodiments as described herewith.

We claim:

1. An apparatus for analysing the intensity of electromagnetic radiation from a sample comprising;
    a dispersing spectrometer in combination with a light source;
    said light source being adapted to illuminate the sample whose spectral properties are to be measured, the light from said sample being adapted to be directed into the dispersing spectrometer including a detector array comprising a number of detectors adapted to measure the intensity of the dispersed light; and
    wherein the apparatus further comprises an element adapted to cause the dispersed light reaching the detectors in the detector array to be modified in intensity non-uniformly across the spectrum to give a response over all the detectors of the detector array within their dynamic range.

2. An apparatus for analysing the intensity of electromagnetic radiation from a sample as in claim 1 wherein the element is an optical element adapted to selectively attenuate the spectrum of the light, either pre or post-dispersal.

3. An apparatus for analysing the intensity of electromagnetic radiation from a sample as in claim 1 wherein the element is a mechanical attenuator adapted to physically restrict the intensity of the light reaching any one of the detectors.

4. An apparatus for analysing the intensity of electromagnetic radiation from a sample as in claim 3 wherein the mechanical attenuator is a slit of variable width across the spectrum.

5. An apparatus for analysing the intensity of electromagnetic radiation from a sample as in claim 1 wherein the element is an attenuating mask positioned on each one of the detectors, the mask extending across a pre-determined surface area of each detector so as to cause in the reduction of the total intensity of light reaching each detector.

6. An apparatus for analysing the intensity of electromagnetic radiation from a sample comprising;
    a dispersing spectrometer in combination with a light source;
    at least one first optical element adapted to direct a desirable pattern of the light from the light source onto the sample whose spectral properties are to be measured;
    at least one second optical element adapted to direct the light from the sample into the dispersing spectrometer including a detector array comprising a number of detectors; and
    one or more third elements adapted to modify the light so as to result in the intensity of the electromagnetic radiation reaching the detector array in a non-uniform intensity to give a response over all detectors of the detector array within their dynamic range.

7. An apparatus for analysing the intensity of electromagnetic radiation from a sample as in claim 6 wherein the one or more third elements are optical elements adapted to attenuate the light prior to it being dispersed by the spectrometer.

8. An apparatus for analysing the intensity of electromagnetic radiation from a sample as in claim 6 wherein the one or more third elements are either optical or mechanical elements adapted to selectively attenuate the intensity of dispersed light within the spectrometer prior to it reaching the detector array.

9. An apparatus for analysing the intensity of electromagnetic radiation from a sample as in claim 6 wherein the light source is one which has a range of wavelengths emitting from the near infra-red through the visible to the ultraviolet regions of the electromagnetic spectrum.

10. An apparatus for analysing the intensity of electromagnetic radiation from a sample as in claim 6 wherein the first optical elements adapted to direct the radiation of the source include an optical fibre adapted to direct the radiation to the sample to be analysed by the spectrometer.

11. An apparatus for analysing the intensity of electromagnetic radiation from a sample as in claim 6 wherein at least one of the second optical elements adapted to direct the radiation from the sample to the detector array includes an optical fibre.

12. An apparatus for analysing the intensity of electromagnetic radiation from a sample as in claim 6 wherein the one or more third element is positioned in between the light source and the sample.

13. An apparatus for analyzing the intensity of electromagnetic radiation from a sample as in claim 6 wherein the one or more third element is positioned between the sample and the spectrometer.

14. An apparatus for analysing the intensity of electromagnetic radiation from a sample as in claim 6 wherein the one or more third element is positioned inside the spectrometer after the dispersion.

15. An apparatus for analysing the intensity of electromagnetic radiation from a sample as in claim 6 wherein the one or more third elements are designed to attenuate the light source or the dispersed beam so that the resulting intensity on the detectors is one that gives substantially uniform electrical or other response per detection element across the spectrum.

16. An apparatus for analysing the intensity of electromagnetic radiation from a sample as in claim 6 wherein the response of the detector array is within several orders of magnitude across the spectrum.

17. An apparatus for analysing the intensity of electromagnetic radiation from a sample as in claim 6 wherein the optical elements are selected from the group consisting of dichroic mirrors, optical filters, fibre optics and any other elements with chromatic or spherical aberration that modify the spectral transmission intensity of a broad band signal.

18. An apparatus for analyzing the intensity of electromagnetic radiation from a sample as in claim 6 further including optical elements adapted to align the intense position of a source to an optical fibre aperture which has a relatively small aperture.

19. An apparatus for analysing the intensity of electromagnetic radiation from a sample as in claim 6 wherein the one or more third elements is a mechanical attenuator.

20. An apparatus for analysing the intensity of electromagnetic radiation from a sample as in claim 19 wherein the mechanical attenuator is a slit whereby light attenuation is achieved by limiting the size of an aperture the light has to pass through before reaching the detector array.

21. An apparatus for analysing the intensity of electromagnetic radiation from a sample as in claim 19 wherein the mechanical attenuator is a linearly varying width slit, whereby the narrowest sections allow least light to pass through the varying width slit, whilst the wider sections allow a greater proportion of the electromagnetic radiation to pass through, thereby selectively attenuating particular regions of the spectrally dispersed light inside of the spectrometer before it reaches or falls onto the detector array.

22. An apparatus for analysing the intensity of electromagnetic radiation from a sample as in claim 6 wherein the one or more third elements is a special spectrally active optical filter positioned in front of the light source.

23. An apparatus for analyzing the intensity of electromagnetic radiation from a sample as in claim 6 wherein the one or more third elements is a special dichroic, spectrally selective mirror, that selectively reflects some regions of a spectrum whilst transmitting others, positioned in between the light source and the dispersing spectrometer.

24. An apparatus for analysing the intensity of electromagnetic radiation from a sample as in claim 6 wherein the one or more third elements is a custom linearly varying neutral density filter attenuator that can be inserted inside of the spectrometer and positioned after the dispersion of the electromagnetic radiation and before the detector array to selectively attenuate the various sections of the dispersed spectrum.

25. An apparatus for analysing the intensity of electromagnetic radiation from a sample as in claim 6 wherein the one or more third elements is an electronically tunable filter or shutter.

26. An apparatus for analysing the intensity of electromagnetic radiation from a sample as in claim 6 wherein the one or more third elements is an integrating sphere.

27. An apparatus for analysing the intensity of electromagnetic radiation from a sample as in claim 6 wherein the one or more third elements is a chromatically aberrating lens.

28. A method for analysing the intensity of electromagnetic radiation from a sample comprising the steps of;
   using a light source to illuminate the sample with desirable light;
   passing the light from the illuminated sample into a dispersing spectrometer;
   passing the dispersed light from the spectrometer into a detector array comprising a plurality of detectors; and
   selectively attenuating the light so that the resultant light falls non-uniformly onto the detector array and gives a response over all the detectors of the detector array within their dynamic range.

29. A method for analysing the intensity of electromagnetic radiation from a sample comprising the steps of;
   using a light source and at least one first optical element to illuminate the sample with desirable light;
   passing the light from the illuminated sample into a dispersing spectrometer using at least one second optical element;
   passing the dispersed light from the spectrometer into a detector array comprising a plurality of detectors; and
   providing at least one third element that is used to selectively attenuate the light so that the resultant electromagnetic radiation falls non-uniformly onto the detector array and gives a response over all the detectors of the detector array within their dynamic range.

* * * * *